United States Patent

[11] 3,609,375

[72] Inventor Murray Bloom
Los Angeles, Calif.
[21] Appl. No. 746,072
[22] Filed July 19, 1968
[45] Patented Sept. 28, 1971
[73] Assignee TRW Inc.
Redondo Beach, Calif.

[54] SOLID STATE LINEAR PHOTOSENSOR
5 Claims, 10 Drawing Figs.
[52] U.S. Cl. .................................................. 250/211,
210/209, 317/235 (27)
[51] Int. Cl. .................................................. H01l 15/00
[50] Field of Search .......................................... 250/211,
208, 209; 317/235 (27), 235 (22.2), 235 (44)

[56] References Cited
UNITED STATES PATENTS
3,448,275 6/1969 Hall .............................. 250/211 X
3,488,508 1/1970 Weimer ......................... 250/211
3,320,426 5/1967 Gray .............................. 250/209
3,418,481 12/1968 Dyn et al. ...................... 250/211
3,432,670 3/1969 Dxn ............................... 250/209

FOREIGN PATENTS
1,077,320 7/1967 Great Britain ................ 250/211

Primary Examiner—Walter Stolwein
Attorneys—Daniel T. Anderson, Alfons Valukonis and Harry I. Jacobs ABSTRACT: There is disclosed a linear solid-state photosensor which exhibits avalanche multiplication and which has a resolution capability comparable to that of silver halide photography. The photosensor is of the type which is suitable for use in a slit image camera of the type commonly carried by airplanes, satellites, or any other moving vehicle which can position the image forming slit so that the scene to be photographed passes by it. In this event, of course, the movement of the scene relative to the camera replaces the more conventional movement of the film relative to the camera's optical axis. The photosensor of this invention replaces the film of the camera in such applications and is capable of providing a direct conversion of the light image to electrical signal output in a manner analogous to that of a television camera. There is also disclosed herein a method of manufacturing the linear solid-state photosensor so as to achieve the desired resolution.

PATENTED SEP28 1971

Murray Bloom
*INVENTOR.*

BY
*Donald C. Kearney*
ATTORNEY

EFFECTIVE LENGTH OF CAPACITOR

Murray Bloom
INVENTOR.

Murray Bloom
INVENTOR.

3,609,375

SOLID STATE LINEAR PHOTOSENSOR

CROSS-REFERENCE TO RELATED APPLICATION

The present invention is an application of an improvement over the method of sputter fabrication of silicon semiconductor rectifying junctions disclosed in British Pat. No. 1,077,320 published July 26, 1967 which in turn was based upon U.S. application Ser. No. 449,885 filed Apr. 21, 1965 by the inventor herein, and now abandoned.

BACKGROUND OF THE INVENTION

Aerial phototelemetry systems depend upon conversion of an optical image formed by a slit-type camera to electrical signals representative of the relative brightness of each element of the image formed by the slit. In practice the elements of the slit image are scanned while the entire apparatus is in motion relative to the image to be photographed. This motion replaces the motion of the film in the conventional motion-picture-type camera or the motion produced by the vertical sweep in a still television camera. Thus, since the camera is in motion and contains only a slit forming a linear image, one needs only to sweep horizontally along a single linear array of photosensors. It is, of course, desirable to provide photo sensors which afford a direct conversion of optical image intensity into electrical signals varying in intensity or amplitude in proportion to the brightness of the image without first interposing the conventional photographic film.

For this purpose the prior art has made various attempts at fabricating a solid-state linear photosensor. The problems in such photosensors have been to obtain sufficient sensitivity or signal-to-noise ratio while still maintaining adequate resolution comparable to that of the silver halide normally used in the conventional photographic process which it is desired to eliminate as an intermediate step. Presently available devices have resolutions far inferior to that of silver halide, or, if their resolution is high, they suffer from lack of photosensitivity.

It is thus an object of this invention to provide a linear solid-state photo sensor which will exhibit avalanche multiplication and will have a resolution comparable to that of silver halide.

SUMMARY OF THE INVENTION

In accordance with the present invention, the sputter deposition technique of the above-noted British Pat. No. 1,077,320 is modified by omitting the mask used therein to produce separate diodes on a single wafer and is further modified by a deliberate reliance on what had heretofore been considered undesirable oxygen and nitrogen impurities to produce a high sheet resistance in the sputter deposited layer which in effect forms a large number of separate diodes insulated from each other by silicon dioxide or silicon nitride layers. This technique is used in conjunction with other techniques of fabricating a monolithic integrated circuit. This integrated circuit contains a series of so called "read" diodes each of which is in circuit with a "write" diode. The array of write diodes are exposed to the linear image from the slit and supply current to the read diodes. The read diodes in turn are connected in circuit to a readout resistor by a scanning means which changes their resistance so that they act as a switch. This scanning means can typically be any scanning light beam such as the beam from a flying spot scanner or a deflected laser beam.

DESCRIPTION OF THE PREFERRED EMBODIMENTS

Figure 1:
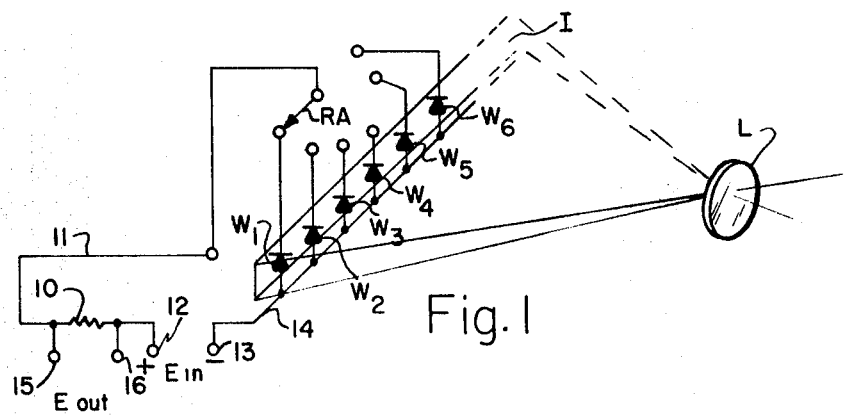
FIG. 1 is a schematic circuit diagram illustrating the principle of the invention.

Consider now the schematic circuit diagram of FIG. 1. A plurality of "write diodes," $W_1$, $W_2$, $W_3$, $W_4$, $W_5$, etc., are connected in parallel to a readout switch the arm of which is connected by conductor 11 through load resistor 10 to the positive side of an input voltage source connected between terminals 12 and 13. Terminal 13 is connected to the opposite terminals of the diodes by conductor 14 the circuit connection being such that any diode connected to the rotary arm RA of a switch is back-biased by the input voltage. An output signal is taken across terminals 15 and 16 on opposite ends of load resistor 10. The diodes are electrically connected in parallel relationship to each other and are physically juxtapositioned next to each other in a linear array. A lens L focuses a slit or linear image on the diodes intensity of which may vary as between individual diodes.

Figure 2:
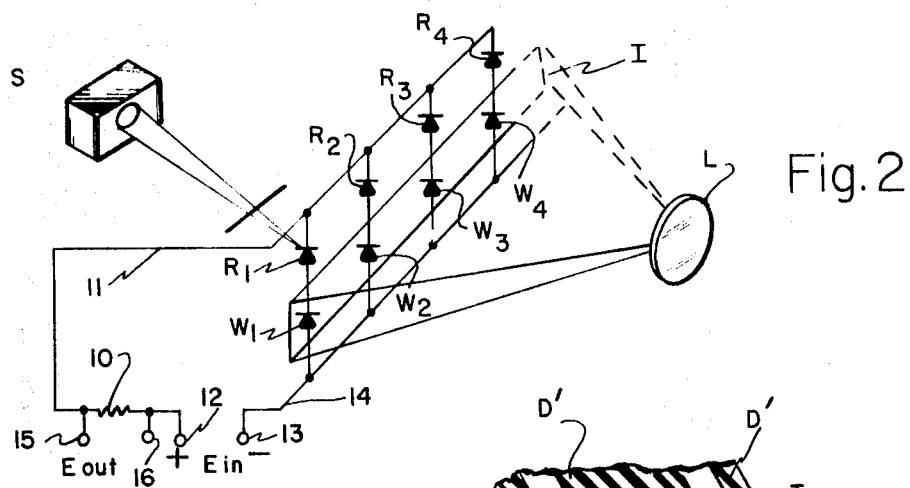
FIG. 2 is a schematic circuit diagram similar to FIG. 1 but showing more practical detail utilizing integrated devices.

It is well known that avalanche multiplication in diodes can result in overall quantum efficiencies greater than one. The value of $E_{in}$ is chosen to be such that a relatively small amount of current passes through the back-biased diodes W when the are dark. When they are illuminated, the amount of current which they will pass and hence the value of $E_{out}$ at the load resistor 10 will depend upon the amount of light falling on whatever diode has been selected by the rotary arm of the switch R. The use of a mechanical switch as shown is obviously impractical if high switching speeds are needed. Therefore, the circuit may be modified as shown in FIG. 2 so as to replace each switch contact with another back-biased diode R. In Fig. 2 parts corresponding to identical parts in Fig. 1 are indicated by the same reference character, as is true throughout the drawings. However, the newly added diodes are indicated by an R with the appropriate subscript to correlate the read diode to its corresponding write diode with which it is connected in electrical series relationship as shown. Thus, read diode $R_1$ is connected in series with write diode $W_1$ between conductors 11 and 14. Similarly read diode $R_2$ is connected in series with write diode $W_2$ also between conductors 11 and 14. A similar relationship holds for all other diodes.

It will thus be seen that the circuit of FIG. 1 has been modified as shown in FIG. 2 so as to replace each of the mechanical switch contacts with another back-biased diode of the R series. Each of these R diodes is in turn scanned with an intense spot of light from a scanning source S. This scanning source may be a conventional flying spot scanner or any other suitable deflectable light source. If a flying spot scanner is used the cathode-ray tube may be modified in shape so as to provide a relatively flat configuration affording only a horizontal linear sweep in order to save space. If intensity of light and scanning resolution is of critical importance in a given system optical means for deflecting a laser beam can readily be provided. Since the details of the scanning mechanism per se do not form a part of this invention, the scan source is indicated only schematically.

When each of the R diodes is scanned with a spot of light, the normally back-biased R diodes act as a switch which closes and allows current to flow through the corresponding W diodes. That is to say, the scanning spot falling on the photosensitive diode lowers its resistance so that this resistance falls from a fixed high value to a fixed low value. Reducing this resistance which is in series with that of the W diodes allows current to flow through the corresponding series connected W diode. This current is, as before, determined in the conducting state of the pair by the amount of light falling on the particular W diode and is sensed as a voltage across the load resistor 10.

If built with discrete components, the circuit sketched in FIG. 2 would not provide the resolution desired. The resolution desired can be obtained, however, if the circuit is fabricated as an integrated microcircuit by making use of the peculiar properties of sputtered silicon which have initially been discussed in the above-noted British patent. A sputtering method is therein disclosed wherein a silicon body is connected to form a cathode in circuit with a metallic anode across which a controlled power source is connected. The cathode and anode are coaligned in a vacuum chamber with a semiconductor substrate such as a silicon wafer positioned between them. When the voltage results in a glow discharge, atoms from the silicon cathode are deposited on the silicon wafer. A detailed analysis of the method is presented in the British patent. As described therein, the intention was to form a plurality of separate diodes on the substrate by interposing a nickel or other metallic mask between it and the cathode the mask having apertures which permitted deposition only in discrete areas. Starting from this premise an attempt was made to minimize the oxygen or nitrogen impurity of the argon gas which was used as the reduced pressure atmosphere in the vacuum vessel. In practice low resistance values can be achieved if desired if an appropriate getter is used to reduce the oxygen and nitrogen impurity. In the absence of such a getter, however, the sheet resistance of the sputter deposited material remains relatively high. However, it has now been found that this sheet resistance is sufficiently high and sufficiently nonuniform in distribution so that it is preferred to permit the oxygen and/or nitrogen impurities to remain in commercial grade tank argon so that the silicon dioxide and the silicon nitride formed in the sputtering process will form insulating deposits which in effect produces a plurality of discrete diodes separated only by molecular layers of these insulators. The use of the apertured mask is thus eliminated and increased resolution is obtained. If no getter is used satisfactory results have been obtained by using an atmosphere either of research grade argon which is 99.9995 percent pure or by using commercial grade argon which is 99.995 percent pure. Thus it follows that the oxygen and nitrogen impurity content in the evacuated vessel will at a minimum be in the range of from 0.0005 to 0.005 of a percent. Additional oxygen may result from outgassing from the walls of the vessel. Otherwise the process of laying down the sputtered layers to be discussed below is the same as that set forth in the British patent. Of course, once a sputtered layer has been deposited on a silicon wafer a linear chip of desired dimensions may be diced from the wafer. It is found that such a linear chip has very high lateral or sheet resistance and thus forms in effect a plurality of juxtaposed diodes or junctions of the type discussed individually in the British patent.

From the above it will be seen that one can by sputtering prepare a layer of one conductivity type of silicon upon a substrate of the opposite conductivity type in such a way that the deposited film does not conduct parallel to the film plane, but does conduct normal to it. (In all of the diagrams and structures herein it will be understood that all P-regions can be interchanged with all of the N-regions.) Such a film on a substrate is equivalent to an array of submicroscopic diodes, each of which is dielectrically isolated from its neighbors.

Figure 3:
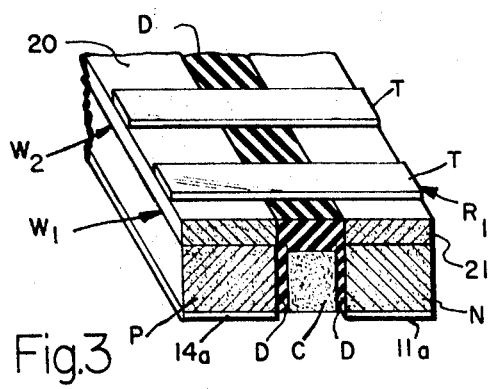
FIG. 3 is a cutaway perspective view illustrating the structure of the integrated device which operates in the manner shown in the circuit diagrams of FIGS. 2 and 5.

In Fig. 3 there is shown one way of using this material to fabricate the equivalent of the circuit shown in FIG. 2. The structure shown is fabricated on a wafer produced by modifying one produced by the dielectric isolation technique disclosed in U.S. Pat. No. 3,320,485 issued to J. L. Buie. It consists of islands of single crystal silicon such as the P-type single crystal P and the N-type single crystal N surrounded first by a layer of silicon dioxide D adjacent to each single crystal and having a matrix of polycrystalline silicon C positioned between the silicon dioxide layers. On this wafer there has been deposited by means of the above described sputtering technique a layer 20 of N-type sputtered silicon above the P-type single crystal P and a layer 21 of P-type sputtered silicon above the N-type single crystal N. This sputtered silicon layer is less than one micron thick. That portion over the single crystal strip will form the array of rectifying junctions. The two portions are separated by a continuation of the silicon dioxide insulating barrier D. Over the sputtered layer separated by the insulating strip D there is deposited a transparent conductive layer which, by means of conventional photoengraving operations, is formed into strips 0.1 mil wide on 0.2 mil centers. These transparent strips are indicated by the reference character T in Fig. 3 Those isolated diodes which do not happen to be between one of these transparent conductive strips and the silicon single crystal strip are, essentially, out of the circuit and need not be considered further. Those that do fall between are connected in parallel with one another by the conductor T. The line image to be sensed falls on junctions in the strip 20 by being transmitted through the transparent conductive strips and penetrating far enough into the layer of sputtered silicon so that the hole-electron pairs which are generated can be collected at the junctions formed between the P-type single crystal P and the sputtered deposit strip 20. The scanning spot used to switch the R diodes similarly falls on the strip 21. The R diodes, of course, are formed between strip 21 and the single crystal strip N. The equivalent of conductor 14 in FIG. 2 is provided by a metallization layer 14a in FIG. 3 which serves as the writing diode bus bar and the equivalent of conductor 11 in FIG. 2 is provided in the device of FIG. 3 by a metallization layer 11a which serves as the reading diode bus bar. Of course it will be understood that the device of Fig. 3 is then electrically connected in series with the appropriate external voltages and load resistor and that means are provided to impress the input image on strip 20 and to impress the scanning spot on strip 21.

The resolution of the device shown in FIG. 3 depends only upon the width and spacing of the transparent conductors T. If widths and spacing of 0.1 mil are used, the device can resolve 5,000 lines per inch. The microscopic diodes under each individual transparent conductive layer are of course connected in parallel by the conductor once it has been applied so that they form effectively a single diode.

Initially the sputtered silicon layer (which is less than one micron thick) forms rectifying junctions over the single crystal strips whereas the portion which is deposited over the silicon dioxide strip, although they will be in the form of isolated crystallites, will constitute a nonconducting layer since they originate at an insulating substrate.

Figure 4:
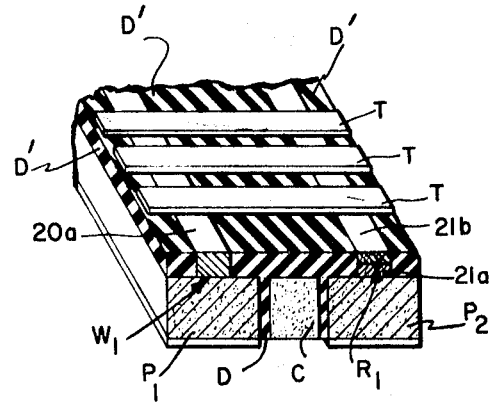
FIG. 4 is a perspective cutaway view showing the structure of an integrated device which operates in the manner illustrated in the circuit diagram of FIG. 6.

It is to be noted that the structure shown in FIG. 3 is only one of many which can be devised. For example, if it is desired not to employ a starting wafer which has islands of the opposite conductivity type, the structure shown in FIG. 4 can be used. In FIG. 4 elements which are the same as those shown in FIG. 3 are identified by the same reference characters. Thus, the polycrystalline silicon area C is surrounded by silicon dioxide layer D which in this embodiment extends further out over the single crystal layers which are here both P-type and are indicated by reference characters $P_1$ and $P_2$.

The image sensing writing diodes are formed by depositing a narrower strip 20a of N-type silicon by the above discussed sputtering technique above the region $P_1$. Similarly a narrower sputtered strip 21a of N-type sputtered silicon is first deposited above the single crystal area $P_2$. A second layer 21a of P-type sputtered silicon is then deposited above this to form the read junctions between layers 21a and 21b. These narrower layers 20a, 21a and 21b are formed in and surrounded by a dielectric insulating layer D which is first deposited on the single crystal layers and is then etched to accommodate the sputtered deposits 20a, 21a and 21b. The transparent conductors T are then deposited as in The FIG. 3 embodiment in a manner well known in the art.

Figure 5:
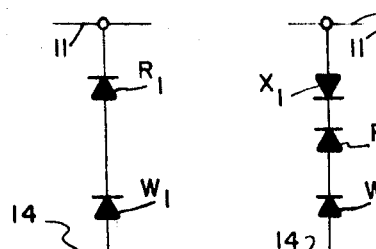
FIG. 5 is a circuit diagram representative of the device of FIG. 3.
Figure 6:
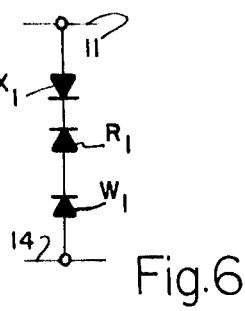
FIG. 6 is a circuit diagram representative of the device of FIG. 4.

The arrangement of FIG. 4 shows how, by the use of the silica layer $D^1$, it is possible to reduce the size of the write junction $W_1$ and the read junction $R_1$ so that the capacitance and dark current can be reduced. Strictly speaking, the circuit which represents the structure shown in FIG 4 is not the same as that shown in FIG. 2. An individual element of the circuit of FIG. 2 (which represents the structure shown in FIG. 3) is shown in FIG. 5 In Fig. 5 it will be noted that the read diode $R_1$ is connected in series with the write diode $W_1$ between conductors 11 and 14. On the other hand, in FIG. 6 there is shown an individual element of the structure of FIG. 4. Here it will be noted that between conductors 11 and 14 there is connected in series not only the read diode $R_1$ and the write diode $W_1$ but also the excess diode $X_1$ formed by the junction between layer $P_2$ and layer 21a. This excess diode $X_1$ of FIG. 6 is biased in the forward configuration and hence does not change the operation of the device.

Figure 7:
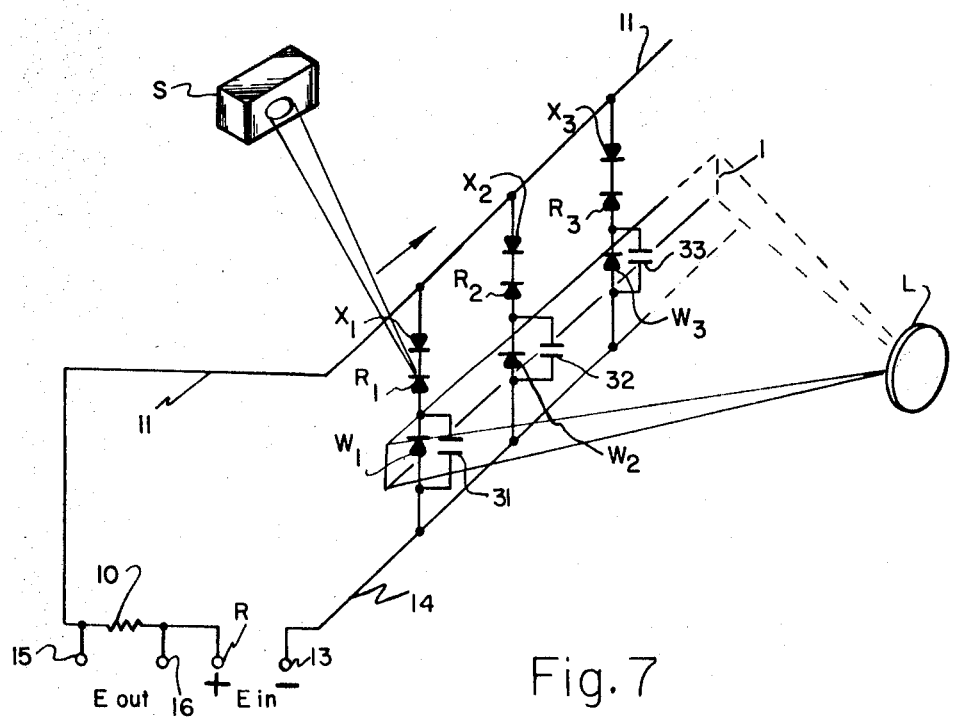
FIG. 7 is a schematic circuit diagram of a device which provides for integration of the incident light.

The devices of FIGS. 3 and 4 as described above will, on interrogation of a particular R diode by the scanning spot, give a signal which is dependent upon the light falling upon the corresponding W diode at that time. Any change in the illumination falling on the W diode between successive scans will be without influence. For many purposes, this is undesirable and it is necessary to integrate the amount of light falling on an individual W diode between successive scans and then, during the next scan, read out this information. This can be done with the addition of a capacitor as shown in the schematic circuit diagram of FIG. 7 and the corresponding structure of FIG. 8. The circuit of FIG. 7 is of the type shown in FIG. 6 and related structures an parts which have been previously discussed are identified by previously used reference characters. It will be noted in FIG. 7 that each of the write diodes has an integrating capacitor in parallel with it. Thus, the capacitor 31 is connected in parallel with diode $W_1$, the capacitor 32 is connected in parallel with diode $W_2$ and the capacitor 33 is connected in parallel with diode $W_3$.

Figure 8:
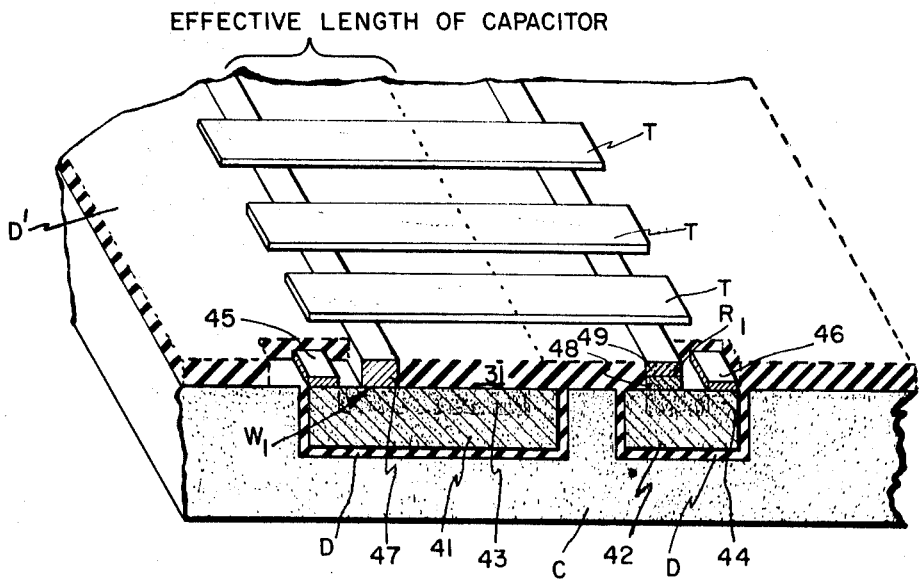
FIG. 8 is a cutaway perspective view of the structure of the device of the type illustrated in FIG. 7.

One device embodying the circuit of FIG. 7 is shown in FIG. 8. This structure of FIG. 8 also shows how an unmodified dielectric isolation semiconductor wafer can be used to fabricate these linear sources. The details of construction shown in FIG. 8 will be described below.

Consider now the operation of the circuit shown in FIG. 7. Assume that at the beginning of the first scan all W diodes are dark. There is no charge on the capacitors 31, 32, or 33 because the R diodes are back-biased. As the scan begins, each R diode conducts and charges the corresponding capacitor. Now, assume the image to fall on the associated W diode. This will result in some of the charge on the capacitor being dissipated. The amount dissipated will depend on the amount of light falling on W since this determines the variation in its resistance. At the next scan, the capacitor is recharged and the amount of charging current which will flow will depend upon how much charge was dissipated from the capacitor since the previous scan. This, in turn, depends upon the total amount of light which fell on W between successive scans. It might at first appear that this scheme required that the W diodes be dark when the R diodes are being scanned so that the capacitor can be fully charged. This is not so. If a particular W diode happens to be illuminated during the charging cycle, an increased amount of current will indeed flow during the charging cycle. This will be sensed as an increased voltage across the load resistor during the first charging cycle and, since the capacitor was not fully charged at that time, as an increased voltage during the next charging cycle. This is not a disastrous circumstance for two reasons. First, the illumination of a particular diode affects the charging current in the manner just described for a period of time equal to $(1/L/s)$ T, where T is the time required to scan the entire array, L is the length of the array, and s is the distance between the centers of adjacent elements. Since L is large and s is small (typical values are 9 inches and $2 \times 10^{14}$ inches, respectively), the influence will be small. Second, the effect of such illumination would be to give an indication, for two successive scans, that the particular element was illuminated. But this is exactly what the situation at that particular element was, and it is this information that is to be extracted during the readout. To summarize, the effect would be to reduce the resolution, in time, by an amount which is too small to be important.

As noted above, the circuit of FIG. 7 is embodied in the device shown in FIG. 8. This structure also shows how an unmodified dielectric isolation wafer prepared in a manner taught by U.S. Pat. No. 3,320,485 issued to J. L. Buie on May 16, 1967 can be used to fabricate these linear sensors. In FIG. 8 like reference characters are again used to refer to elements corresponding to those which have already been described. Thus, a polycrystalline substrate C has formed therein dielectric isolation layer D. Within these isolated areas the single crystal P-type semiconductor is converted to a P+ region as at 41 and 42 respectively by conventional diffusion techniques. This diffusion leaves the undiffused single crystal P-type silicon areas 43 and 44 respectively within the diffused P+ areas and adjacent to the top surface of the wafer. An insulating silicon dioxide layer is then deposited over this top surface to form the isolation patterns D. Before the isolation layer D is deposited, a metal contact strip 45 is deposited above the region 41 and a second metal contact strip 46 is deposited above the region 42. The silicon dioxide is then deposited over these and a portion of it is then etched away to permit the sputter deposition of a strip 47 of N-type silicon forming at the interface between it and the P-region 43 the series of write junctions W. Additionally, a similar strip is etched away above the region 44 and an N-type layer of silicon is first sputter deposited at 48. Thereafter, a P-type silicon layer is deposited above it at 49 to form between the layers 48 and 49 the read junctions R. The transparent conductive strips are next evaporated by first applying a complete layer or thin film of gold or tin oxide and then etching out the lines separating the conductive transparent strips T which result from this step.

The write junction $W_1$ is indicated between region 43 and strip 47 by the arrowhead line whereas the read junction is similarly indicated between strips 48 and 49. Of course the X-junction is formed between regions 44 and 48 but is not indicated in FIG. 8 for clarity. The capacitor 31 is formed between the lower surface of the transparent conducting strip T which serves as an upper capacitor plate and the junction between region 43 and the silicon dioxide layer above it. The region 43 is of course conductive silicon and its top surface serves as the other plate of the capacitor. The dielectric of the capacitor is indicated in FIG. 8 by the the underlined reference character 31 and comprises the portion of the silicon dioxide bounded by the upper surface of region 43, the lower surface of conductive strip T and by the strip 47 and the edge of the dielectric isolation area D. This capacitor serves the function of the capacitor 31 in FIG. 7. The operation of this device has been discussed above in connection with FIG. 7.

Figure 9:
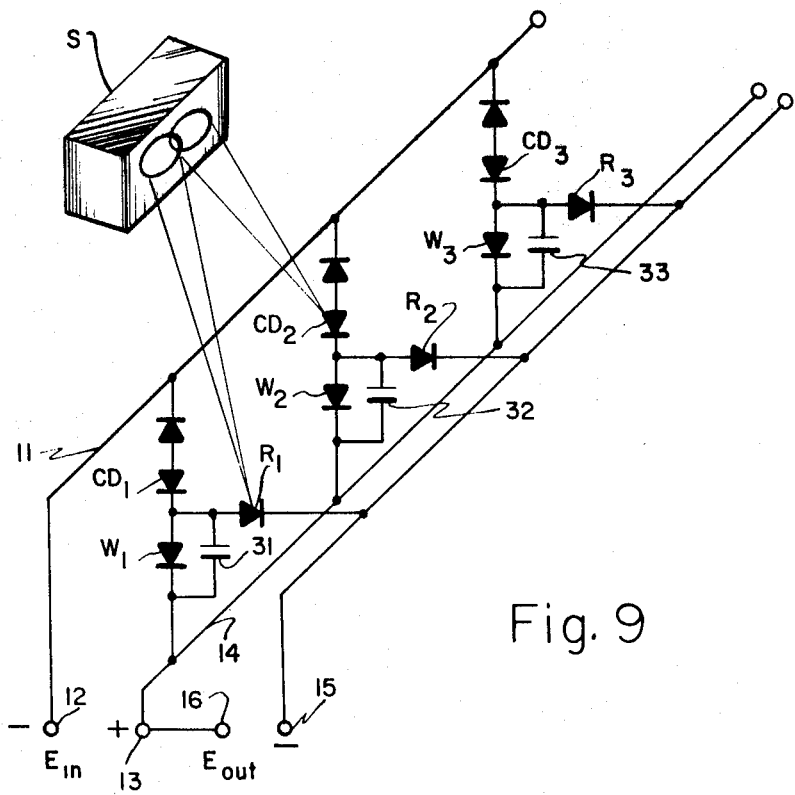
FIG. 9 is a schematic circuit diagram of another embodiment of the device.
Figure 10:
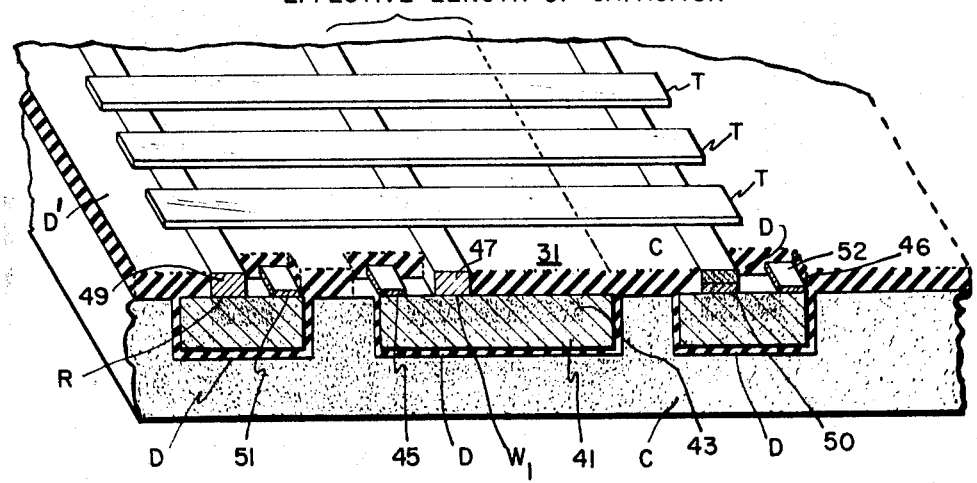
FIG. 10 is a cutaway perspective view of a device structure embodying the circuit of FIG. 9.

The circuit shown in FIG. 9 is similar to that shown in FIG. 7 except that the functions of charging and readout are separated. The structure corresponding to this circuit is shown in FIG. 10. Again in both FIGures reference characters which have been previously used for identical items are repeated. The image source is omitted in FIG. 9 for clarity of illustration but would be the same as in all other Figures. The scan source shows two scanning beams one slightly leading the other for a reason to be described below.

In this scheme each capacitor is charged through diode CD after it has been interrogated by the scanning spot through diode R by the second beam from the same scanner. The unidentified diode associated with diode CD is nonfunctional and arises from the method chosen to build the device as shown in FIG. 10. In the circuit as configured in FIG. 9 no load resistor is necessary since a voltage output is being taken directly across the diode $R_1$. If a load resistor is included in the charging circuit of FIG. 9, there are then available two places to extract information as to the amount of light which fell on the W diodes since the previous scan. It will be noted that the conductor 14 leads to terminal 13 which is a common between the negative input terminal 12 and the negative output terminal 15 since positive output terminal 16 is directly connected to 13.

In FIG. 10 the corresponding structure is shown comprising the substrate C in which dielectric isolation regions are formed by barriers D and in which diffusion layers are then formed as in FIG. 8. It will be noted however that a third dielectric isolation region is used in which a diode CD is formed by depositing sputtered layers 50 and 51 above the diffusion area and providing the metallization conductive strip 52.

While a specific preferred embodiment of the invention has been described by way of illustration only it will be understood that the invention is capable of many other specific embodiments and modifications and is defined solely by the following claims.

What is claimed is:
1. A linear solid state photo sensor device comprising:
   a. a semiconductor substrate having at least two elongated parallel regions each having a predetermined conductivity of a type opposite from the other:
   b. means interposed between said regions to isolate them from each other electrically;
   c. a semiconductor layer above each of said regions, each of said layers being of a conductivity type opposite to that of its associated region to form a photosensitive rectifying junction therewith;
   d. means interposed between said layers to isolate them from each other electrically;
   e. a plurality of transparent conductive strips parallel to each other and perpendicular to said elongated regions, each strip connecting the pair of rectifying junctions under it in electrical series circuit relationship in the same direction;
   f. electrically conductive contact means on the lower surface of each of said regions to connect said plurality of pairs of series connected junctions in parallel circuit relationship:
   g. voltage means connected across said parallel circuit to apply reverse bias on each pair of said rectifying junctions; and
   h. optical scanning means for scanning the portions of said transparent conducting strips overlying one of the rectifying junctions of each said pairs.

2. Apparatus as in claim 1 wherein an integrating capacitor is formed in parallel circuit relationship with the other one of the rectifying junctions of each said pair of junctions 3. In combination comprising:
   a plurality of pairs of photosensitive diodes positioned adjacent to each other in linear sequential relationship to form an elongated image sensing element, the diodes of each pair being connected in an electric series circuit relationship and all of the pairs of diodes being connected in electric parallel circuit relationship;
   means for applying an input voltage across said parallel circuit;
   the first diode in each of said pairs being positioned immediately adjacent to and coaligned with a corresponding diode in a succeeding adjacent one of said pairs so as to receive a linear segment of an optical image falling thereon, said first diodes each being reverse biased;
   a second diode in each of said pairs being positioned immediately adjacent to a second diode in another of said pairs to form a linear switching segment, said second diodes each being reverse biased; and
   an optical scanning means for scanning said linear switching segment to read out from each of said pairs of diodes the intensity of light in said image.

4. The combination set forth in claim 14 wherein said diodes comprise an integrated circuit formed in a semiconductor substrate, said integrated circuit having at least 5,000 diodes per linear inch of said sensing element.

5. The combination set forth in claim 3 wherein each of said first diodes has an integrating capacitor connected in parallel therewith.

UNITED STATES PATENT OFFICE
CERTIFICATE OF CORRECTION

Patent No. 3,609,375             Dated   September 28, 1971

Inventor(s)   Murray Bloom

It is certified that error appears in the above-identified patent and that said Letters Patent are hereby corrected as shown below:

Column 1, line 6      after "Pat." insert --specification--

Column 1, line 8      delete "449,885" and substitute --449,855--

Column 2, line 38     delete "the" second occurrence and substitute --they--

Column 4, line 70     delete "21a" and substitute --21b--

Column 5, line 2      delete "The" and substitute --the--

Column 5, line 34     delete "an" and substitute --and--

Column 6, line 1      delete "$2 \times 10^{14}$" and substitute --$2 \times 10^{-4}$--

Column 8, line 33, in claim 4    delete "14" and substitute --3--

Signed and sealed this 28th day of March 1972.

(SEAL)
Attest:

EDWARD M. FLETCHER, JR.                ROBERT GOTTSCHALK
Attesting Officer                      Commissioner of Patents